United States Patent
Jang et al.

(10) Patent No.: US 12,418,037 B2
(45) Date of Patent: Sep. 16, 2025

(54) APPARATUS FOR CONTROLLING MOISTURE CONTENT OF FUEL CELL UNIT

(71) Applicants: Hyundai Motor Company, Seoul (KR); Kia Corporation, Seoul (KR)

(72) Inventors: In Woo Jang, Hwaseong-si (KR); Seong Jae Shin, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 578 days.

(21) Appl. No.: 17/814,359

(22) Filed: Jul. 22, 2022

(65) Prior Publication Data
US 2023/0063702 A1 Mar. 2, 2023

(30) Foreign Application Priority Data

Aug. 4, 2021 (KR) .......................... 10-2021-0102698

(51) Int. Cl.
| | |
|---|---|
| *H01M 8/04119* | (2016.01) |
| *H01M 8/04701* | (2016.01) |
| *H01M 8/04746* | (2016.01) |
| *H01M 8/04828* | (2016.01) |
| *H01M 8/249* | (2016.01) |

(52) U.S. Cl.
CPC ... *H01M 8/04126* (2013.01); *H01M 8/04731* (2013.01); *H01M 8/04753* (2013.01); *H01M 8/04835* (2013.01); *H01M 8/249* (2013.01); *H01M 2250/20* (2013.01)

(58) Field of Classification Search
CPC ......... H01M 8/04731; H01M 8/04753; H01M 8/04835; H01M 8/249; H01M 2250/20
See application file for complete search history.

(56) References Cited

U.S. PATENT DOCUMENTS

| | | | |
|---|---|---|---|
| 2011/0129741 A1* | 6/2011 | Kusano | H01M 8/04149 429/413 |
| 2021/0226234 A1* | 7/2021 | Takahashi | H01M 8/04164 |

FOREIGN PATENT DOCUMENTS

| | | | |
|---|---|---|---|
| JP | 2007-305326 | * | 11/2007 |
| KR | 1020160039495 A | | 12/2004 |

OTHER PUBLICATIONS

English translation of JP Publication 2007-305326, Nov. 2007.*

* cited by examiner

*Primary Examiner* — Brittany L Raymond
(74) *Attorney, Agent, or Firm* — Slater Matsil, LLP

(57) ABSTRACT

An apparatus for controlling a moisture content of a fuel cell unit includes: a controller configured to determine a driving condition of a first fuel cell unit comprising a first fuel cell stack, a first compressor configured to compress air flowing into the first fuel cell stack, and a first humidifier positioned on a rear end of the first compressor, determine a driving condition of a second fuel cell unit comprising a second fuel cell stack, a second compressor configured to compress air flowing into the second fuel cell stack, and a second humidifier positioned on a rear end of the second compressor, and control the moisture content such that the first fuel cell unit and the second fuel cell unit are driven at controlled operation temperatures in response to the determined driving conditions of the first fuel cell unit and the second fuel cell unit.

20 Claims, 5 Drawing Sheets

APPARATUS FOR CONTROLLING MOISTURE CONTENT OF FUEL CELL UNIT

CROSS-REFERENCE TO RELATED APPLICATIONS

This application claims under 35 U.S.C. § 119(a) the benefit of priority to Korean Patent Application No. 10-2021-0102698 filed on Aug. 4, 2021, the entire contents of which are incorporated herein by reference.

TECHNICAL FIELD

The present disclosure relates to an apparatus for controlling a moisture content of a fuel cell unit, and more preferably, to an apparatus for controlling a moisture content of a fuel cell unit for controlling an operation of a fuel cell to maintain the same moisture content operation point between the fuel cell units in order to optimize the driving of the fuel cell unit positioned on a front of a vehicle relatively close to a traveling direction and the driving of the fuel cell unit positioned on a rear thereof relatively.

BACKGROUND

Generally, a fuel cell is a power generation system configured to directly convert fuel energy into electric energy and has the advantages of low pollution and high efficiency. In particular, the fuel cell may generate the electric energy using energy sources, such as petroleum energy, natural gases, and methanol, that are easy to store and transport and therefore, is highlighted as a next-generation energy source. Such a fuel cell is classified into a phosphoric acid type, a molten carbonate type, a solid oxide type, a polymer electrolyte type, an alkali type fuel cell, etc. depending upon the type of electrolyte used, and the respective fuel cells are basically operated in the same principle but the type of fuel used, an operating temperature, a catalyst, an electrolyte, etc. are different from each other.

The polymer electrolyte type fuel cell is a fuel cell using a polymer film having a hydrogen ion exchange property as the electrolyte, and has a high-output property having a current density greater than that of other types of fuel cells, has a simple structure, a fast start-up and responsiveness, and excellent durability, and may use methanol or natural gases in addition to hydrogen as the fuel. Therefore, the polymer electrolyte type fuel cell is suitable for the applications to various fields, such as a power source for a vehicle, a distributed type, a generator for on-site installation, an emergency power source for military use, and a power source for spacecraft. A fuel cell stack basically includes a polymer electrolyte membrane, and an anode electrode and a cathode electrode bonded to both surfaces of the electrolyte membrane. The electrolyte membrane, the anode electrode, and the cathode electrode constitute a unit cell called a membrane-electrode assembly (MEA). To improve performance for electrochemical reactivity, ionic conductivity, electronic conductivity, fuel or oxidant deliverability, by-product deliverability, interfacial stability, etc., the anode electrode and the cathode electrode are preferably configured to include platinum catalyst layer and diffusion layer, respectively. Further, the fuel cell stack includes a bipolar plate installed between the unit cells and a monopolar plate installed between one side surface of the unit cell and an end plate. These plates have electrical insulating properties and flow paths for supplying the fuel are installed on one surface or both surfaces thereof. A laminate of the plurality of unit cells and the plates is fixed in a state of being pressurized by a pair of end plates and a fastening member.

An operation principle of the aforementioned fuel cell stack is as follows. First, when hydrogen is supplied to the anode electrode and oxygen or air including the oxygen is supplied to the cathode electrode, the hydrogen supplied to the anode side is divided into electrons and hydrogen ions in the platinum catalyst layer, and the electrons move along an external wire and the hydrogen ions move through the electrolyte membrane and then the oxygen, the electrons, and the hydrogen ions meet on the cathode side to generate water. At this time, electric energy is obtained by the electrons moving through the external circuit.

Recently, a vehicle that may be traveled by driving the fuel cell stack has emerged, and furthermore, the development for the vehicle including multiple fuel cell stacks is being carried out to increase the distance to empty of the vehicle and to improve performance.

However, the fuel cell stacks mounted on various positions have problems in that each fuel cell stack may have different driving temperatures depending upon traveling wind, and efficiency of the electric energy generated depending upon different traveling temperatures may be different from each other.

Further, since the vehicle that performs the autonomous traveling through the fuel cell stack may have at least one fuel cell stack positioned at a position facing the traveling direction of the vehicle, a control for equally maintaining the moisture content for performing an optimal operation at the position of the fuel cell stack positioned in the vehicle is essentially required.

The above information disclosed in this Background section is only for enhancement of understanding of the background of the disclosure and accordingly it may include information that does not form the prior art that is already known in this country to a person of ordinary skill in the art.

SUMMARY

The present disclosure has been made in an effort to solve the above problem associated with the related art, and an object of the present disclosure is to provide a moisture content control of multiple fuel cell units according to different driving conditions through an apparatus for controlling a moisture content of the fuel cell unit.

Further, another object of the present disclosure is to provide an apparatus for controlling a moisture content of a fuel cell unit configured to control a humidifier for controlling a moisture content control, an operation pressure, and a flow volume of a supply gas.

The objects of the present disclosure are not limited to the aforementioned objects, and other objects of the present disclosure not mentioned may be understood by the following description, and seen by an exemplary embodiment of the present disclosure more clearly. Further, the objects of the present disclosure may be achieved by a means described in the claims and a combination thereof.

An apparatus for controlling a moisture content of a fuel cell unit for achieving the object of the present disclosure includes the following configuration.

As an exemplary embodiment of the present disclosure, the apparatus for controlling the moisture content of the fuel cell unit includes a first fuel cell unit positioned on a front relatively in a traveling direction of a vehicle and comprising a first fuel cell stack, and including a first compressor configured to compress air flowing into the first fuel cell stack and a first humidifier positioned on a rear end of the first compressor; a second fuel cell unit positioned away relatively in the traveling direction of the vehicle and comprising a second fuel cell stack, and including a second compressor configured to compress air flowing into the second fuel cell stack and a second humidifier positioned on a rear end of the second compressor; and a control unit configured to determine driving conditions of the first fuel cell unit and the second fuel cell unit, and to control a moisture content such that the first fuel cell unit and the second fuel cell unit are driven at optimal operation temperatures in response to the driving condition of the first fuel cell unit and the driving condition of the second fuel cell unit.

Further, the first fuel cell unit further includes a first bypass configured to bypass the first humidifier.

Further, the second fuel cell unit further includes a second bypass configured to bypass the second humidifier.

Further, the control unit allows an operation point of the first fuel cell unit and an operation point of the second fuel cell unit to be driven along the same moisture content line in response to the driving condition of the first fuel cell unit and the driving condition of the second fuel cell unit.

Further, the driving condition includes a driving temperature of each fuel cell unit.

Further, the control unit is configured to control the first fuel cell unit and the second fuel cell unit such that an operation point of the first fuel cell unit and an operation point of the second fuel cell unit are positioned on the same moisture content line.

Further, the control unit is configured to control the first humidifier and the second humidifier such that an amount of humidity of the first fuel cell unit is smaller than an amount of humidity of the second fuel cell unit.

Further, the control unit controls a driving pressure of the first fuel cell unit to be lower than a driving pressure of the second fuel cell unit.

Further, the control unit controls a flow volume of a supply gas of the first fuel cell unit to be higher than a flow volume of a supply gas of the second fuel cell unit.

The present disclosure may obtain the following effects by the aforementioned exemplary embodiment and the configuration, coupling, and use relationship to be described later.

The present disclosure may perform the control of allowing the multiple fuel cell units configured at different positions to have the same moisture content operation point through the apparatus for controlling the moisture content of the fuel cell unit.

Further, the present disclosure may control the multiple fuel cell units to have the same moisture content, thereby providing the optimal driving temperatures of the multiple fuel cell units having different driving conditions.

It is understood that the term "automotive" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid automotives, electric vehicles, plug-in hybrid electric vehicles, hydrogen-powered vehicles and other alternative fuel vehicles (e.g., fuels derived from resources other than petroleum). As referred to herein, a hybrid automotive is an automotive that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
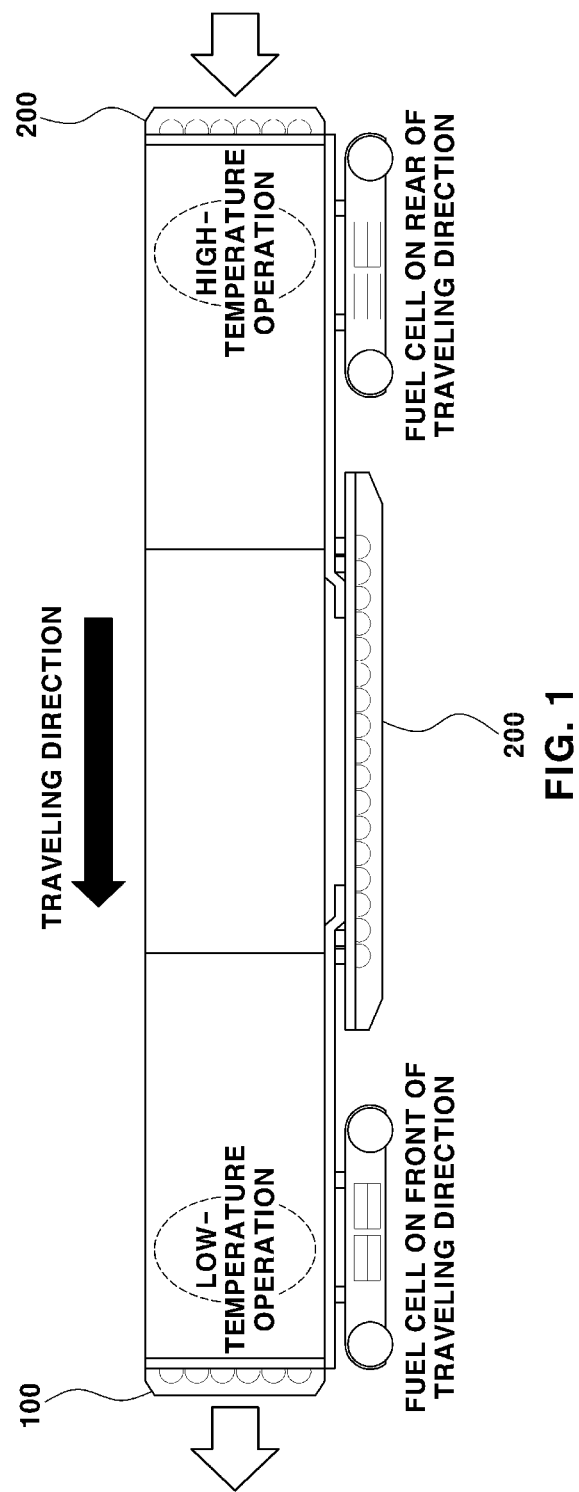
FIG. 1 illustrates a perspective diagram of a vehicle including an apparatus for controlling a moisture content of a fuel cell unit as an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION OF ILLUSTRATIVE EMBODIMENTS

Hereinafter, embodiments of the present disclosure will be described in more detail with reference to the accompanying drawings. The embodiments of the present disclosure may be modified in various forms, and the scope of the present disclosure should not be construed as being limited to the following embodiments. The present embodiment is provided to more fully explain the present disclosure to those skilled in the art.

Embodiments of the present disclosure relate to an apparatus for controlling a moisture content of a fuel cell unit, and, in some embodiments, to an apparatus for controlling a moisture content of a fuel cell unit for controlling an operation of a fuel cell to maintain the same moisture content operation point between the fuel cell units in order to optimize the driving of the fuel cell unit positioned on a front of a vehicle relatively close to a traveling direction and the driving of the fuel cell unit positioned on a rear of the vehicle thereof relatively.

Further, terms such as " . . . stack", " . . . machine", and " . . . unit" described in the specification mean a unit that processes at least one function or operation, and these may be implemented by hardware, software, or a combination of hardware and software.

Further, in the present specification, the reason why the names of the components are divided into a first, a second, etc. is to distinguish the names of the components in the same relationship, and the components are not necessarily limited to orders thereof in the following description.

Furthermore, as the names of the components in the present specification, the first refers to a fuel cell unit 100 and sub-components positioned in a region positioned relatively adjacent to a traveling direction of a vehicle, and the second refers to a fuel cell unit 200 and sub-components positioned in a region positioned relatively away from the traveling direction of the vehicle.

Further, in the present specification, 'optimal operation temperatures' as the names of the components may be construed as optimal operation temperatures of fuel cell stacks 130, 230 according to temperatures set in a control unit 300, and therefore, are configured to be changed depending upon a control method disclosed in the present disclosure.

Hereinafter, the exemplary embodiment will be described in detail with reference to the accompanying drawings, and in describing the exemplary embodiment with reference to the accompanying drawings, the same or corresponding components are denoted by the same reference numerals and overlapping descriptions thereof will be omitted.

The fuel cell units 100, 200 according to the present disclosure include the fuel cell stacks 130, 230, and include compressors 110, 210 and humidifiers 120, 220 sequentially positioned on introduction terminals flowing into the fuel cell stacks 130, 230.

Furthermore, the fuel cell units 100, 200 according to the present disclosure may be composed of hydrogen fuel cells, use a method for reacting hydrogen and oxygen to produce electricity, and may be configured to include an anode into which hydrogen is injected into the fuel cell stacks 130, 230 as a supply gas, a cathode into which air (oxygen) is injected, and an electrolyte filled between two electrodes, respectively.

On the anodes of the fuel cell stacks 130, 230, hydrogen reacts and is divided into hydrogen ions and electrons, and the divided electrons move along a circuit connected to the outside and then finally flow into the cathode, and the introduced electrons are bonded with oxygen to ionize the oxygen and oxygen ions are bonded with the hydrogen ions, thereby generating water as a byproduct. Therefore, currents output by the fuel cell stacks 130, 230 are determined depending upon the degree at which hydrogen and oxygen react, and when high outputs are required from electronic parts, larger amounts of hydrogen and oxygen flow into the fuel cell stacks 130, 230 to meet required amounts of electronic parts.

However, there occur problems in that a difference between amounts of moisture in the fuel cell stacks 130, 230 occurs depending upon environments where the fuel cell stacks 130, 230 are driven, the fuel cell stacks 130, 230 are switched into a state of being vulnerable to flooding in a low-temperature driving condition, and the fuel cell stacks 130, 230 are switched into a state of being vulnerable to drying in a high-temperature driving condition.

Furthermore, the driving (reaction) of a first fuel cell unit 100 positioned adjacent to a traveling direction of a vehicle among the multiple fuel cell units 100, 200 is performed in a relatively low-temperature state due to the influence of traveling wind, etc., and a second fuel cell unit 200 mounted at a position relatively away from the traveling direction of the vehicle has a relatively high-temperature driving state compared to the driving condition of the first fuel cell unit 100. Therefore, the apparatus for controlling the moisture contents of the fuel cell units 100, 200 according to the present disclosure is configured to perform a control of the driving pressures between the fuel cell units 100, 200 driven in different temperature conditions, the flow volumes of the supply gases, and the humidity of the supply gases.

The control unit 300 controls the operation point such that each of the fuel cell units 100, 200 is driven along the same moisture content line, and therefore, configured such that each of the fuel cell units 100, 200 is driven at an optimal operation temperature depending upon an individual driving temperature.

FIG. 1 illustrates a side diagram of an autonomous vehicle including the fuel cell units 100, 200 positioned on a front of a vehicle as an exemplary embodiment of the present disclosure.

The vehicle illustrated is a vehicle driven by the autonomous traveling, and includes the first fuel cell unit 100 positioned on the front of the vehicle and configured to perform the traveling of the vehicle, and the second fuel cell unit 200 configured to be fixed to a vehicle body on a rear of the vehicle or a central lower end of the vehicle.

The autonomous vehicle is configured in a state where the bi-directional traveling is available, the first fuel cell unit 100 and the second fuel cell unit 200 may be relatively determined in response to the traveling direction of the vehicle.

Each of the fuel cell units 100, 200 includes a supply gas storage tank, and is configured to be fluid-connected from the supply gas storage tank into the fuel cell stacks 130, 230. Furthermore, the control unit 300 may control pressures of the supply gases applied to the fuel cell stacks 130, 230 from the supply gas storage tank. More preferably, the control unit 300 is configured to control driving amounts of compressors 110, 210 positioned between the supply gas storage tank and the fuel cell stacks 130, 230. Furthermore, the fuel cell units 100, 200 include humidifiers 120, 220 positioned between the rear ends of the compressors 110, 210 and introduction portions of the fuel cell stacks 130, 230, the control unit 300 may be configured to control humidity of the supply gas supplied.

At least one sensor unit (not illustrated) may be included in the fuel cell stacks 130, 230 or the introduction portions thereof, and the sensor units may measure the driving temperatures and humidity in the fuel cell stacks 130, 230. Further, the fuel cell units 100, 200 may further include pressure sensors positioned on the front ends of the introduction portions of the fuel cell stacks 130, 230 or the introduction portion thereof. The control unit 300 may receive the driving conditions of the fuel cell stacks 130, 230 measured by the sensor units and/or the pressure sensors.

The control unit 300 may set the pressure of the supply gas introduced from the supply gas storage tank, and at the same time, control the opening or closing of pressure valves positioned on discharge terminals of the fuel cell stacks 130, 230 to set the driving pressures in the fuel cell stacks 130, 230. Further, the control unit 300 may control the humidity of the supply gases flowing into the fuel cell stacks 130, 230. Furthermore, the humidity in the fuel cell stacks 130, 230 is proportional to the relative humidity, and is decreased as the driving temperature is high and a high flow volume of the supply gas is injected. Therefore, the control unit 300 may measure the driving temperature of each of the fuel cell stacks 130, 230 such that the multiple fuel cell stacks 130, 230 maintain the operation points along the same moisture content line, and control the pressure of the supply gas, the humidity of the supply gas, and the flow volume of the supply gas flowing into each of the fuel cell stacks 130, 230 to obtain a driving optimal point according to the measured driving temperature.

In other words, the control unit 300 is configured to control the operation point of each of the fuel cell units 100, 200 such that the multiple fuel cell stacks 130, 230 are driven along the same moisture content line diagram through the control of the pressure of the supply gas, the humidity of the supply gas, and the flow volume of the supply gas.

Further, the control unit 300 is configured to receive the driving temperatures in the fuel cell stacks 130, 230 from the sensor units to set the operation points corresponding to the moisture content line diagram stored in the control unit 300. To set the operation point of each of the fuel cell units 100, 200 to have the optimal operation temperature on the same moisture content line diagram, the control unit 300 is configured to control the pressure of the supply gas, the humidity of the supply gas, and the flow volume of the supply gas that flows into each of the fuel cell stacks 130, 230. Furthermore, the control unit 300 is configured to control opening degrees of the pressure valves positioned on the discharge ports to set the driving pressures in the fuel cell stacks 130, 230.

Figure 2:
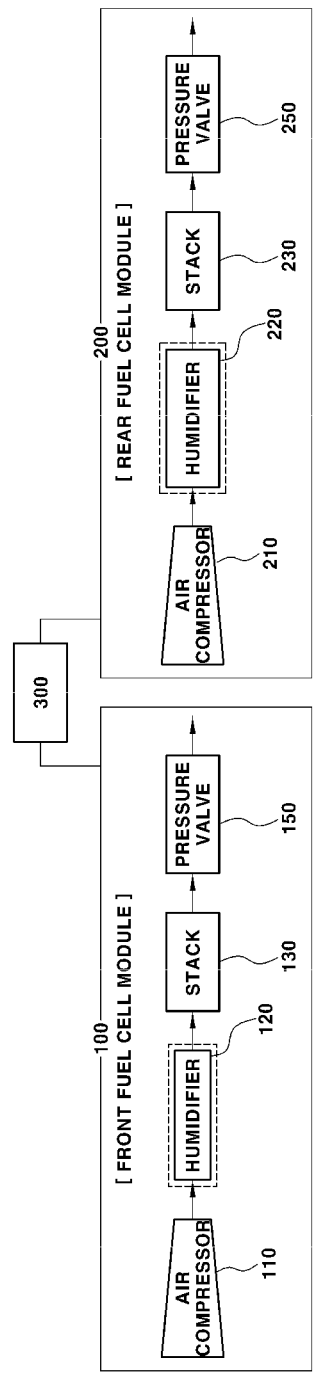
FIG. 2 illustrates a configuration diagram of the fuel cell unit as the exemplary embodiment of the present disclosure.
Figure 3:
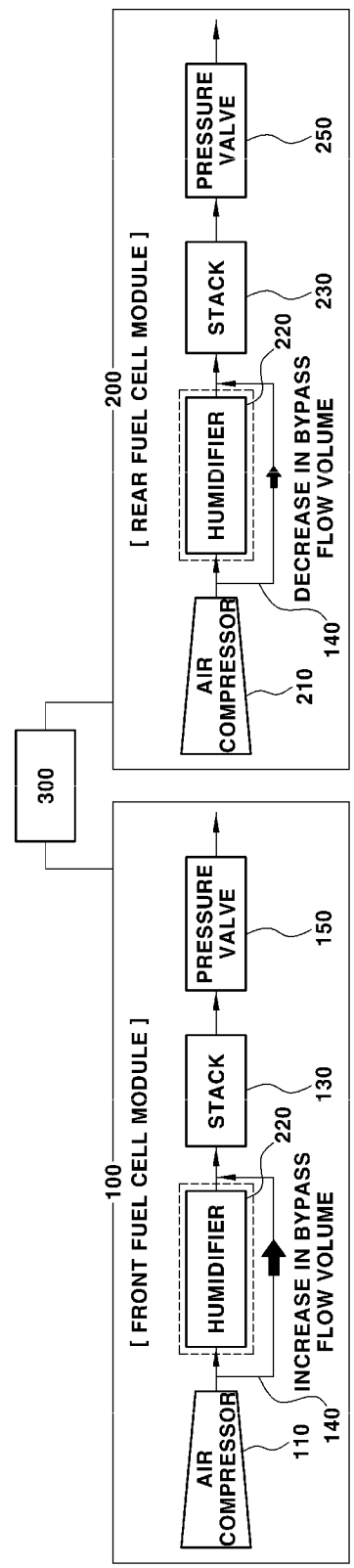
FIG. 3 illustrates a configuration diagram of a fuel cell unit as another exemplary embodiment of the present disclosure.

FIGS. 2 and 3 illustrate configuration diagrams of the first fuel cell unit 100 and the second fuel cell unit 200.

The first fuel cell unit 100 may be positioned on the front relatively close to the traveling direction of the vehicle. More preferably, the first fuel cell unit 100 may be positioned on the edge end of the front of the vehicle.

In FIG. 2, the first fuel cell unit 100 includes the introduction portion fluid-connected to the supply gas storage tank on the introduction terminal thereof with respect to the first fuel cell stack 130. A first compressor 110 and a first humidifier 120 are configured to be positioned between the supply gas storage tank and the first fuel cell stack 130. The first compressor 110 and the humidifier 120 may be sequentially positioned, and are each configured such that driving forces of the compressors 110, 210 and humidity of the humidifiers 120, 220 applied to the supply gas are controlled by the control unit 300.

Further, in FIG. 3, the fuel cell unit 100 includes a first bypass 140 fastened to an introduction terminal and a discharge terminal of the first humidifier 120 and configured to bypass the first humidifier 120, the control unit 300 is configured to humidify the first fuel cell stack 130 using the first humidifier 120 or to drive the first fuel cell stack 130 in a state of being relatively dried through the first bypass 140.

In comparison, the second fuel cell unit 200 is positioned to be relatively spaced apart from the traveling direction of the vehicle, the second fuel cell unit 200 may be positioned on one end of the rear of the vehicle according to the exemplary embodiment of the present disclosure.

In FIG. 2, the second fuel cell unit 200 includes the introduction portion fluid-connected to the supply gas storage tank on the introduction terminal with respect to the second fuel cell stack 230. The second fuel cell unit 200 is configured such that a second compressor 210 and a second humidifier 220 are positioned between the supply gas storage tank and the second fuel cell stack 230. The supply gas storage tank connected to the second fuel cell stack 230 may be a supply gas storage tank fluid-connected to the first fuel cell stack 130, or a supply gas storage tank configured separately. The second compressor 210 or the second humidifier 220 may be sequentially positioned, and is each configured such that the driving force and the humidity are controlled by the control unit 300.

The fuel cell unit 200 includes a second bypass 240 positioned on an introduction terminal and a discharge terminal of the second humidifier 220 and configured to bypass the second humidifier 220, the control unit 300 is configured to humidify the second fuel cell stack 230 using the second humidifier 220 or to drive the second fuel stack 230 in a state of being relatively dried through the second bypass 240.

More preferably, in case of the vehicle capable of bi-directional traveling, the corresponding fuel cell unit that is positioned on one end of the traveling direction upon one-directional traveling and referred to as the first fuel cell unit 100 may be positioned on one end of the vehicle spaced apart from the traveling direction upon the other directional traveling, and therefore, set as the second fuel cell unit 200. In other words, the first fuel cell unit 100 and the second fuel cell unit 200 are relatively determined and therefore, may be determined depending upon the traveling direction.

The control unit 300 may control the pressures and water contents of the supply gases flowing into the fuel cell stacks 130, 230 from the supply gas storage tank, and control the flow volume of the supply gas introduced from the supply gas storage tank. Furthermore, since the control of the pressure of the supply gas, the water content of the supply gas, and the flow volume of the supply gas may be set depending upon the moisture content stored in the control unit 300, the control unit 300 may control the first fuel cell unit 100 and the second fuel cell unit 200 to have the operation points along the same moisture content line based on moisture content map data stored in the control unit 300.

Figure 4A:
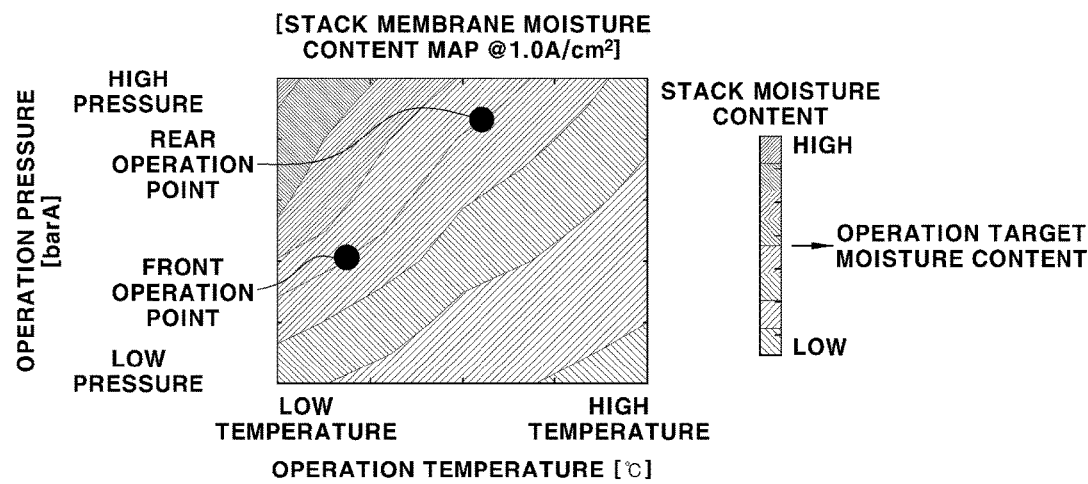
FIG. 4A illustrates a moisture content line diagram according to an operation pressure as the exemplary embodiment of the present disclosure.
Figure 4B:
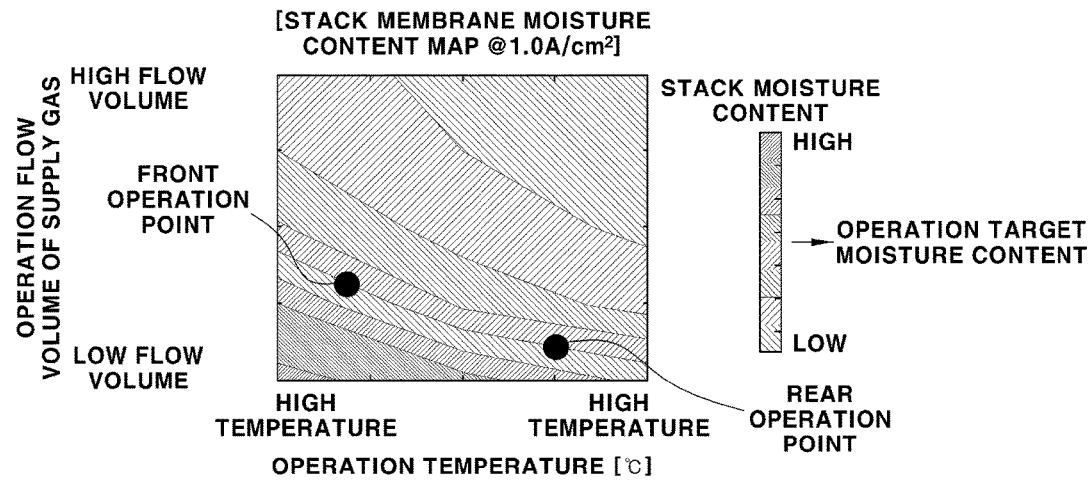
FIG. 4B illustrates a moisture content line diagram according to a flow volume of a supply gas as the exemplary embodiment of the present disclosure.
Figure 4C:
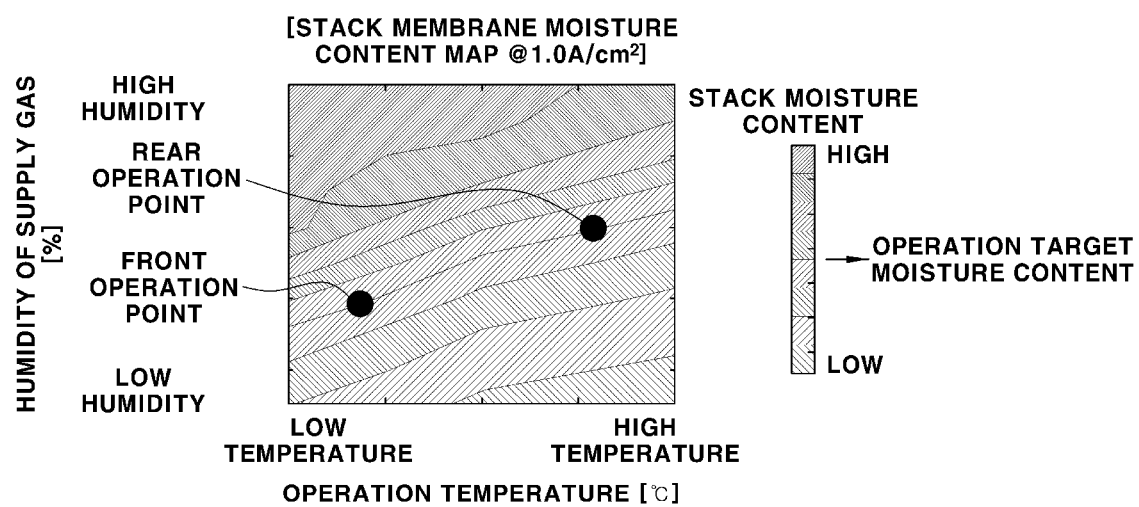
FIG. 4C illustrates a moisture content line diagram according to humidity of the supply gas as the exemplary embodiment of the present disclosure.

FIGS. 4A to 4C illustrate moisture content map data stored in the control unit 300 as the exemplary embodiment of the present disclosure, and each illustrate driving moisture content regions of the fuel cell stacks 130, 230 through the pressure of the supply gas, the flow volume of the supply gas, and the water content (humidity) of the supply gas.

The moisture content disclosed in the present disclosure may be proportional to the relative humidity in the fuel cell stacks 130, 230, and the relative humidity in the fuel cell stacks 130, 230 is inversely proportional to the flow volume of the supply gas and the driving temperature.

Therefore, the relative humidity may be determined by current water vapor pressures in the fuel cell stacks 130, 230 based on saturated water vapor pressures, and the water vapor pressure may be calculated by multiplying the operation pressures of the fuel cell stacks 130, 230 by a water vapor molar fraction. As described above, an Equation that calculates the relative humidity is as follows.

$$RH \text{ (relative humidity)} = Ph20 \text{ (water vapor pressure)} / Psat \text{ (saturated water vapor pressure)}$$

$$Ph20 = Pop \text{ (operation pressure)} \times mfh20 \text{ (water vapor molar fraction)} \quad \text{Equation 1}$$

Looking at the contents based on the above, as illustrated in FIG. 4A, the control unit 300 stores the moisture content map data according to the pressure of the supply gas, and receives the driving temperatures according to the driving conditions of the first fuel cell unit 100 and the second fuel cell unit 200. The control unit 300 determines the driving moisture content of each of the fuel cell units 100, 200 in response to the received driving temperature, and sets the operation point according to the optimal operation temperature at the corresponding driving temperature. To correspond to the thus determined optimal moisture content line, the control unit 300 is configured to control the pressure of the supply gas. Therefore, each of the fuel cell units 100, 200 is driven depending upon the optimal operation points at the corresponding driving temperature.

More preferably, the fuel cell units 100, 200 are configured to decrease the pressure of the supply gas supplied to the first fuel cell unit 100 and to increase the pressure of the supply gas supplied to the second fuel cell unit 200 to correspond to the illustrated front operation points.

In other words, the first fuel cell unit 100 having the relatively low-temperature driving temperature positioned on the front of the vehicle controls the pressure of the supply gas to have the low-pressure driving pressure, and is configured such that the water vapor pressure in the first fuel cell stack 130 decreases and therefore, the relative humidity is decreased.

Conversely, the second fuel cell unit 200 having the relatively high-temperature driving temperature positioned on the rear of the vehicle controls the pressure of the supply gas to have the high-pressure driving pressure, and is configured such that the water vapor pressure in the second fuel cell stack 230 increases and therefore, the relative humidity is increased. Therefore, the optimal operation temperature in the first fuel cell stack 130 is configured to decrease, and the optimal operation temperature in the second fuel cell stack 230 is configured to increase.

Therefore, the first fuel cell stack 130 of the first fuel cell unit 100 and the second fuel cell stack 230 of the second fuel cell unit 200 are controlled to be driven along the optimal operation points on the same moisture content line diagram.

FIG. 4B illustrates a temperature-flow volume of the supply gas distribution graph in which the first fuel cell unit 100 and the second fuel cell unit 200 are positioned on the same moisture content line and controlled to have the operation points by controlling the flow volumes of the supply gases flowing into the fuel cell stacks 130, 230.

If the flow volume of the supply gas is increased, the relative humidity in the stack is configured to be inversely proportional to the flow volume of the supply gas, and the first fuel cell unit 100 is controlled such that a high flow volume of gas is supplied to the first fuel cell unit 100 relatively positioned on the front of the vehicle, and the relative humidity is decreased. Conversely, a low flow volume of gas is configured to be supplied to the second fuel cell unit 200, and the second fuel cell unit 200 is constituted such that the relative humidity in the second fuel cell stack 230 is increased.

Therefore, the optimal operation temperature in the first fuel cell stack 130 is configured to be decreased, and the optimal operation temperature in the second fuel cell stack 230 is configured to be increased. Therefore, as illustrated, the first fuel cell stack 130 of the first fuel cell unit 100 and the second fuel cell stack 230 of the second fuel cell unit 200 are controlled to be driven on the same moisture content line diagram.

FIG. 4C illustrates a configuration in which each of the fuel cell units 100, 200 is controlled to have the operation point on the same moisture content line diagram by controlling the humidity of the supply gas as the exemplary embodiment of the present disclosure.

The supply gas flowing into the first fuel cell unit 100 positioned relatively close to the front of the traveling direction is controlled such that a relatively small amount of moisture is provided through the first humidifier 120, and controlled such that an amount of moisture is decreased and the optimal operation temperature is decreased when the first fuel cell stack 130 is driven.

In comparison, the supply gas flowing into the second fuel cell unit 200 positioned relatively away from the traveling direction is humidified to have a high content of moisture compared to that of the supply gas supplied into the first fuel cell stack 130 through the second humidifier 220. Therefore, an amount of moisture of the supply gas flowing into the second fuel cell stack 230 is more than an amount of moisture of the supply gas flowing into the first fuel cell stack 130, and the optimal operation temperature of the first fuel cell stack 130 is configured to be decreased.

In other words, the optimal operation temperature of the second fuel cell unit 200 is configured to be increased by providing the supply gas with a large amount of moisture in response to the driving condition of the second fuel cell unit 200 positioned on the rear of the traveling direction of the vehicle to control the operation point of the second fuel cell unit 200 along the moisture content line.

In summary, the present disclosure provides the vehicle including the first fuel cell unit 100 and the second fuel cell unit 200 having different driving conditions, and the control unit 300 controls the pressure, flow volume, and water content (moisture) of the introduced supply gas such that the operation point of each of the first fuel cell unit 100 and the second fuel cell unit 200 has the same moisture content. Therefore, each of the fuel cell units 100, 200 is configured to be operated at the driving optimal operation temperature of each of the fuel cell units 100, 200.

The aforementioned detailed description is illustrative of the present disclosure. Further, the aforementioned contents show and describe preferred exemplary embodiments of the present disclosure, and the present disclosure may be used in various other combinations, modifications, and environments. That is, changes or modifications are possible within the scope of the concept of the disclosure disclosed in the present specification, the scope equivalent to the disclosed contents, and/or within the scope of technology or knowledge in the art. The described exemplary embodiment describes the best mode for implementing the technical spirit of the present disclosure, and various changes required in specific application fields and uses of the present disclosure are possible. Therefore, the detailed description of the present disclosure is not intended to limit the present disclosure to the disclosed exemplary embodiments. Further, the appended claims should be construed as including other exemplary embodiments as well.

What is claimed is:

1. An apparatus comprising:
a first fuel cell unit positioned toward a front of a vehicle in a traveling direction of the vehicle, the first fuel cell unit comprising a first fuel cell stack, a first compressor configured to compress air flowing into the first fuel cell stack, and a first humidifier positioned downstream from the first compressor;
a second fuel cell unit positioned farther from the front of the vehicle in the traveling direction of the vehicle than the first fuel cell unit, the second fuel cell unit comprising a second fuel cell stack, a second compressor configured to compress air flowing into the second fuel cell stack, and a second humidifier positioned downstream from the second compressor; and
a control unit configured to determine operating conditions of the first fuel cell unit and the second fuel cell unit, and to control the first humidifier and the second humidifier to adjust a moisture content of the first fuel cell unit and the second fuel cell unit such that the first fuel cell unit and the second fuel cell unit operate at respective target temperatures in response to the determined operating conditions of the first fuel cell unit and the second fuel cell unit, wherein the operating conditions of the first fuel cell unit and the second fuel cell unit include respective temperature conditions of the first fuel cell unit and the second fuel cell unit.

2. The apparatus of claim 1, wherein the first fuel cell unit further comprises a first bypass configured to bypass the first humidifier.

3. The apparatus of claim 1, wherein the second fuel cell unit further comprises a second bypass configured to bypass the second humidifier.

4. The apparatus of claim 1, wherein the control unit allows the first fuel cell unit and the second fuel cell unit to be operated under a same moisture content condition in response to the operating conditions of the first fuel cell unit and the second fuel cell unit.

5. The apparatus of claim 1, wherein the control unit is configured to control the first fuel cell unit and the second fuel cell unit such that the first fuel cell unit and the second fuel cell unit are operating under a same moisture content condition.

6. The apparatus of claim 5,
wherein the control unit is further configured to control the first humidifier and the second humidifier such that an amount of humidity of the first fuel cell unit is smaller than an amount of humidity of the second fuel cell unit.

7. The apparatus of claim 5, wherein the control unit is further configured to control a driving pressure of the first fuel cell unit to be lower than a driving pressure of the second fuel cell unit.

8. The apparatus of claim 5, wherein the control unit is further configured to control a flow volume of a supply gas of the first fuel cell unit to be higher than a flow volume of a supply gas of the second fuel cell unit.

9. The apparatus of claim 1, wherein the respective target temperatures comprise optimal operation temperatures.

10. The apparatus of claim 1, wherein the second fuel cell unit is positioned toward a rear of the vehicle or a central lower end of the vehicle.

11. An apparatus for controlling a moisture content of a fuel cell unit comprising:
a controller configured to
determine an operating condition of a first fuel cell unit comprising a first fuel cell stack, a first compressor configured to compress air flowing into the first fuel cell stack, and a first humidifier positioned on a rear end of the first compressor,
determine an operating condition of a second fuel cell unit comprising a second fuel cell stack, a second compressor configured to compress air flowing into the second fuel cell stack, and a second humidifier positioned on a rear end of the second compressor, and
control the moisture content of the first fuel cell unit and the second fuel cell unit such that the first fuel cell unit and the second fuel cell unit are driven at controlled operation temperatures in response to the determined operating condition of the first fuel cell unit and the determined operating condition of the second fuel cell unit, wherein the operating condition of the first fuel cell unit and the operating condition of the second fuel cell unit comprise respective temperature conditions of the first fuel cell unit and the second fuel cell unit.

12. The apparatus of claim 11, wherein the controller is further configured to:
control the first fuel cell unit and the second fuel cell unit such that the first fuel cell unit and the second fuel cell unit are operating under a same moisture content condition in response to the operating condition of the first fuel cell unit and the operating condition of the second fuel cell unit.

13. The apparatus of claim 12, wherein the controller is further configured to:
control the first humidifier and the second humidifier such that an amount of humidity of the first fuel cell unit is smaller than an amount of humidity of the second fuel cell unit.

14. The apparatus of claim 12, wherein the controller is further configured to control a driving pressure of the first fuel cell unit to be lower than a driving pressure of the second fuel cell unit.

15. The apparatus of claim 12, wherein the controller is further configured to control a flow volume of a supply gas of the first fuel cell unit to be higher than a flow volume of a supply gas of the second fuel cell unit.

16. A method of controlling a moisture content of a fuel cell unit, the method comprising:
determining an operating condition of a first fuel cell unit comprising a first fuel cell stack, a first compressor configured to compress air flowing into the first fuel cell stack, and a first humidifier positioned on a rear end of the first compressor,
determining an operating condition of a second fuel cell unit comprising a second fuel cell stack, a second compressor configured to compress air flowing into the second fuel cell stack, and a second humidifier positioned on a rear end of the second compressor, and
controlling the moisture content of the first fuel cell unit and the second fuel cell unit such that the first fuel cell unit and the second fuel cell unit are driven at controlled operation temperatures in response to the determined operating condition of the first fuel cell unit and the determined operating condition of the second fuel cell unit, wherein the operating condition of the first fuel cell unit and the operating condition of the second fuel cell unit comprise respective temperature conditions of the first fuel cell unit and the second fuel cell unit.

17. The method of claim 16, further comprising controlling the first fuel cell unit and the second fuel cell unit such that the first fuel cell unit and the second fuel cell unit are operated under a same moisture content condition in response to the operating condition of the first fuel cell unit and the operating condition of the second fuel cell unit.

18. The method of claim 16, further comprising controlling the first humidifier and the second humidifier such that an amount of humidity of the first fuel cell unit is smaller than an amount of humidity of the second fuel cell unit.

19. The method of claim 16; further comprising controlling a driving pressure of the first fuel cell unit to be lower than a driving pressure of the second fuel cell unit.

20. The method of claim 16, further comprising controlling a flow volume of a supply gas of the first fuel cell unit to be higher than a flow volume of a supply gas of the second fuel cell unit.

* * * * *